Patented Nov. 25, 1930

1,782,432

UNITED STATES PATENT OFFICE

ALEXANDER DOUGLAS MACALLUM, OF PERTH AMBOY, NEW JERSEY

SYNTHESIS OF DIACETYL-3,3'-DIAMINO-4,4'-DIHYDROXY-5,5'-DIIODOARSENOBENZENE

No Drawing. Application filed March 30, 1928, Serial No. 266,120, and in Great Britain May 4, 1927.

Although iodides and certain organic iodine derivatives have had medical application in conjunction with the aromatic arseno compounds, efforts to combine the effects of the two by introduction of nuclear halogen into the arsenicals themselves have not heretofore been successful otherwise, possibly, than in the case of bismethylamino-tetraminoarsenobenzene (Kolle: Deutsche Medizinische Wochenschrift, 44, 1177 (1918); Giemsa: same, 45, 95 (1919)).

This patent application concerns the synthesis of another effective aromatic arsenical containing nuclear halogen, diacetyl-3,3'-diamino-4,4'-dihydroxy-5,5'-diiodoarsenobenzene (IV), solutions of which are remarkably stable. The drug produces no undesirable nervous effects, is generally well tolerated by mice and has at the same time a strong trypanocidal action.

The foregoing arseno-compound (IV) is produced by reduction of acetyl-3-amino-4-hydroxy-5-iodophenylarsonic acid (III), which in turn is prepared by reduction of 3-nitro-4-hydroxy-5-iodophenylarsonic acid (1) to 3-amino-4-hydroxy-5-iodophenylarsonic acid (II) and by subsequent acetylation of the amino-acid.

The four compounds, of which (I), the nitro-acid, is well known (Raiziss, Kolmer, and Gavron: J. Biol. Chem., 40, 541 (1919); Stieglitz, Kharasch, and Hanke; J. Amer. Chem. Soc., 43, 1192 (1921)) are formulated as follows:

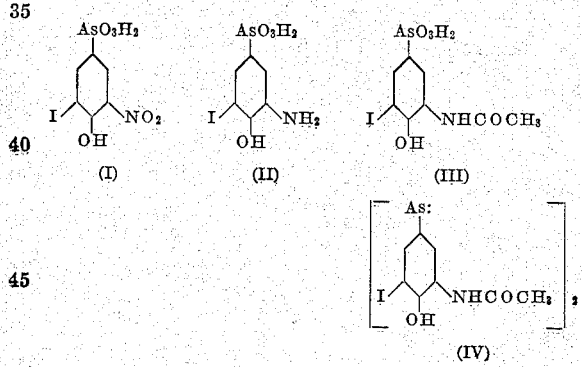

Reduction of the nitro-acid (I) to the amino-acid (II) can be effected in cold alkaline solution either by an excess of freshly-precipitated titanous or ferrous oxide or by use of sodium hydrosulphite.

To obtain the acetylamino-acid (III), the reduction mixture in the first case is freed from iron or titanium oxides by filtration, the filtrate neutralized with acetic acid, and then treated under cooling with an excess of acetic anhydride. The acetyl compound crystallizes out after a time.

The procedure is more direct where hydrosulphite has been used for the reduction, as in the following example.

*Acetyl-3-amino-4-hydroxy-5-iodophenylarsonic acid (III)*.—A solution of 3.9 g. of the nitro-acid (1) in 40-80 cc. of water and 2 cc. of 10-N alkali is treated at 0° with sufficient hydrosulphite powder (6-8 g.) to bleach it. Acetic anhydride is now added at intervals in several portions of 1 cc. After 2-3 hours most of the acetyl derivative will have separated, and the sulphite may then be destroyed by the gradual addition of 50-60 cc. of hydrogen peroxide (or until a drop of the solution no longer decolourizes potassium triiodide), the solution being kept nearly neutral by suitable additions of sodium bicarbonate. Finally, the whole of the acetyl compound is precipitated (yield, 2.99 g.; 74%) by making the solution just acid to Congo paper.

The washed and dried product forms a cake of colourless needles, m. p. 158–159°, readily soluble in the alcohols and acetone.

By recrystallization from dilute acetic acid (1:1), the acetyl compound is obtained in prisms, m. p. 190–191°.

The two forms of acetylamino-acid lead on reduction to what appear to be (from mixed melting points) identical arseno compounds. The reduction may suitably be carried out as follows:

*Diacetyl-3,3'-diamino-4,4'-dihydroxy-5,5'-diiodoarsenobenzene (IV)*.—A solution of 2.7 g. of the preceding acetyl compound (either form) in 100 cc. of water containing 3 g. of sodium bicarbonate is warmed at 55–60° with 15 g. of hydrosulphite in an atmosphere of nitrogen for 4–5 hours. The arseno compound separating forms, after washing and drying in a vacuum, a lemon-yellow powder (yield 1.66 g.; 70%), m. p. 194° after sintering at about 180°.

It is soluble in acetone, phenol, benzaldehyde, or pyridine, and its dilute solutions in alkali carbonates or hydroxides undergo little apparent change on exposure to the air.

What I claim is:

1. A process for synthesis of diacetyl-3,3'-diamino-4,4'-dihydroxy-5,5'-diiodoarsenobenzene which consists in warming together, in an indifferent atmosphere, substantially neutral solutions of acetyl-3-amino-4-hydroxy-5-iodophenylarsonic acid and sodium hydrosulphite, suitably at 55–60°.

2. As a new product, diacetyl-3,3'-diamino-4,4'-dihydroxy-5,5'-diiodoarsenobenzene, said product being a lemon-yellow solid soluble in acetone, phenol, benzaldehyde and pyridine.

Signed at Perth Amboy, N. J., U. S. A., this 20th day of March, 1928.

ALEXANDER DOUGLAS MACALLUM.